(12) United States Patent
Iwago

(10) Patent No.: US 7,688,482 B2
(45) Date of Patent: Mar. 30, 2010

(54) CUT-SHEET FEEDING APPARATUS, DOCUMENT-SHEET FEEDING APPARATUS, AND DOCUMENT-SHEET READING APPARATUS

(75) Inventor: Toshitaka Iwago, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 890 days.

(21) Appl. No.: 11/466,255

(22) Filed: Aug. 22, 2006

(65) Prior Publication Data

US 2007/0045945 A1 Mar. 1, 2007

(30) Foreign Application Priority Data

Aug. 23, 2005 (JP) ............................. 2005/240922

(51) Int. Cl.
 *H04N 1/04* (2006.01)
 *B65H 5/22* (2006.01)
 *B41J 3/00* (2006.01)

(52) U.S. Cl. ........................ 358/496; 358/498; 347/4; 399/361; 399/363; 271/3.15

(58) Field of Classification Search ............... 358/504, 358/500, 400, 496, 498; 347/3, 4; 399/16, 399/361, 363, 365, 368, 379, 380; 271/3.14, 271/3.15, 3.17, 4.03, 10.02, 10.03, 400, 410, 271/424
See application file for complete search history.

(56) References Cited

U.S. PATENT DOCUMENTS 4,504,161 A * 3/1985 Volke et al. ................. 400/605

4,848,941 A * 7/1989 Imaseki ....................... 406/120

(Continued)

FOREIGN PATENT DOCUMENTS

| JP | H5 006123 | 1/1993 |
| JP | H5 155463 | 6/1993 |
| JP | H5 61153 | 8/1993 |

(Continued)

*Primary Examiner*—Jerome Grant, II
(74) *Attorney, Agent, or Firm*—Baker Botts L.L.P.

(57) ABSTRACT

A document feeding apparatus in a cover body supported by a document reading table whose upper surface is at least partially constituted by a platen glass. The cover body is openable and closable relative to the table and covers the glass when closed. The apparatus feeds a document sheet along a feed path from at a document setting portion and to a document ejecting portion. The apparatus comprises: an upper and a lower feed roller that are disposed along the path to pinch and feed the sheet; a bearing member supporting a shaft of the lower roller such that the lower roller is movable onto and away from the upper roller; a protrusible member disposed in the cover body and below the lower roller to be movable between an outer position to protrude from a bottom of the cover body and an inner position not to protrude therefrom, the protrusible member being placed at the outer position when the cover body is open, and at the inner position by the document reading table when the cover body is closed; and a biasing member supported by the protrusible member and biasing the lower roller toward the upper roller, such that when the protrusible member is at the outer position, the lower roller is off the upper roller, and when the protrusible member is at the inner position, the lower roller is in pressing contact with the upper roller.

19 Claims, 11 Drawing Sheets

U.S. PATENT DOCUMENTS

| | | | |
|---|---|---|---|
| 5,267,058 A * | 11/1993 | Sata | 358/498 |
| 5,816,723 A * | 10/1998 | Takahashi et al. | 400/624 |
| 2002/0140800 A1* | 10/2002 | Saito et al. | 347/222 |
| 2005/0069370 A1* | 3/2005 | Yamada et al. | 400/663 |
| 2006/0280530 A1* | 12/2006 | Andoh | 399/301 |
| 2007/0127079 A1* | 6/2007 | Iwata et al. | 358/400 |

FOREIGN PATENT DOCUMENTS

| | | |
|---|---|---|
| JP | H7 157132 | 6/1995 |
| JP | 3660859 | 3/2005 |

\* cited by examiner

CUT-SHEET FEEDING APPARATUS, DOCUMENT-SHEET FEEDING APPARATUS, AND DOCUMENT-SHEET READING APPARATUS

INCORPORATION BY REFERENCE

The present application is based on Japanese Patent Application No. 2005-240922, filed on Aug. 23, 2005, the contents of which are incorporated herein by reference.

BACKGROUND OF THE INVENTION

1. Field of the Invention

The present invention relates to a cut-sheet feeding apparatus, a document feeding apparatus, and a document-sheet reading apparatus.

2. Description of Related Art

There is widely known an image, processing apparatus, such as a scanner, a copier, a facsimile machine, or a multi-function apparatus having two or more of a scanner function, a copier function, and a facsimile function, which includes a cut-sheet feeding apparatus that automatically picks up a plurality of cut sheets such as recording sheets or document sheets set on a setting portion or a supply tray to one by one supply the cut sheets into a feed path. Each cut sheet is then fed along the feed path down to an ejecting portion or a catch tray, onto which the cut sheet as having been fed is ejected, via a reading position or a recording position. For instance, the cut-sheet feeding apparatus may be an ADF Automatic Document Feeder) included in an image reading apparatus to feed document sheets to be read, or a recording-medium feeding apparatus included in an image recording apparatus to feed recording media on which an image or information is to be recorded.

There will be briefly described a known ADF as a kind of the cut-sheet feeding apparatus, which includes a supply tray, a catch tray, a pickup portion, and a feeding portion. Document sheets, with images to be read thereon, are set on the supply tray. The pickup portion picks up the document sheets one by one from the supply tray and feeds each document sheet into a feed path, along which a reading position at which the document sheet is read is located. The feeding portion operates to feed the document sheet along the feed path, so that each document sheet is read at the reading position and further fed along the feed path down to the catch tray at an end of the feed path. That is, after read, the document sheet is ejected onto the catch tray.

The pickup portion includes a pickup chute formed continuously with the supply tray, a pickup roller, a pickup nipper, a separating roller, and a separating nipper. The pickup roller is rotatably disposed on a lower guide surface of the pickup chute. On an upper guide surface of the pickup chute that is opposed to the pickup roller, the pickup nipper is disposed such that the pickup nipper is capable of moving onto and away from the pickup roller, and held biased by a spring member against the pickup roller so that the pickup nipper and the pickup roller are in direct pressing contact with each other while not nipping a document sheet therebetween.

When a stack of document sheets are set on the supply tray, a part of the stack is disposed between the pickup nipper and the pickup roller, such that the stack is biased onto the pickup roller by the pickup nipper. A lowermost one of the document sheets that is in direct pressing contact with the pickup roller receives a rotation force of the pickup roller to be fed along a supply direction, that is, picked up out of the supply tray into the feed path.

The separating roller is rotatably disposed on the lower guide surface of the pickup chute, with an interval from the pickup roller in the supply direction. On the upper guide surface of the pickup chute, the separating nipper is disposed to be capable of moving onto and away from the separating roller, and held biased by a spring member against the separating roller so that the separating nipper and the separating roller are in direct contact with each other while not nipping a document sheet therebetween. The document sheet fed into the feed path by the pickup roller is nipped between the separating roller and the separating nipper, thereby receiving a rotation force of the separating roller to be further fed along the supply direction.

The feeding portion is disposed on the downstream side of the pickup chute, and includes a pair of feed rollers, namely, a feeder roller and a pinch roller disposed adjacent thereto. The pair of feed rollers is disposed along the feed path, which is substantially U-shaped in cross section. The pinch roller is held biased onto the feeder roller and rotated with rotation of the feeder roller. Thus, while not nipping a document sheet therebetween, the pinch roller and the feeder roller are held in direct pressing contact with each other.

The document sheet fed into the feed path is nipped between the rotating feeder roller and pinch roller to be fed along the feed path. The feed path is open downward at a reading position, which corresponds to a reading surface in a platen glass under which an image scanner or an image reading device is disposed. That is, the feed path includes an open portion at a bottom surface of a cover body or a document cover. The document sheet is guided by a guide member to the open portion of the feed path so that the image reading device reads the document sheet as passing over the platen glass. The document sheet having been read is further fed from the open portion along the feed path to be eventually ejected onto the catch tray.

Where a paper jam occurs such that a document sheet is caught in the feed path in the ADF, the caught document sheet is being nipped between the feeder roller and the pinch roller since the feeder roller and the pinch roller are held against each other. Thus, it is impossible to remove the document sheet from the feed path without damaging the document sheet, unless the pressing contact between the feeder roller and the pinch roller is eliminated.

It is known to prevent such a problem by providing an arrangement for eliminating pressing contact between a feeder roller and a pinch roller to release a sheet nipped therebetween by imparting a force to separate the feeder roller and the pinch roller from each other. For instance, such an arrangement is disclosed in the following publications: JP-A-5-6123 (publication 1) and JP-A-5-155463 (publication 2).

The publication 1 discloses a recording-medium feeding apparatus including a lever with which a cam is integrally formed. When the lever is manipulated, the cam presses a shaft of one of a pair of feed rollers to eliminate pressing contact between the feed rollers.

The publication 2 discloses to dispose a pinch roller on an end portion of a plate member that is supported at an intermediate portion thereof such that the plate member is capable of swinging around the supported portion. By pushing up an end portion of the plate member opposite to the end portion on which the pinch roller is disposed, the pinch roller is separated from the feeder roller.

Further, techniques related to the present invention are disclosed in the following publications also: JP-U-5-61153 (publication 3), JP-U-7-157132 (publication 4), and JP-B2-3660859 (publication 5).

The publication 3 discloses a device for removing a document sheet caught in a facsimile machine. The eliminating device includes a cam mechanism that operatively associates an action of opening a cover body for opening a feed path of an ADF, with an action of pushing down a shaft of a pinch roller. Hence, when a user desiring to remove a caught document sheet opens the cover body, the pinch roller is automatically pushed down and separated from a feeder roller.

The publication 4 discloses a recording-medium feeding apparatus including two movable sheet guides each of which supports a pinch roller that is biased to be held in pressing contact with a feeder roller. When a first one of the sheet guides is moved to separate the pinch roller from the corresponding feeder roller, a second sheet guide is automatically moved to separate the pinch roller supported by a second one of the sheet guides from the corresponding feeder roller.

The publication 5 discloses a document-sheet feeding apparatus constructed such that when a document sheet is caught in a feed path while being fed along a platen glass, a document cover or a cover body is moved to its opened position, and then an auxiliary frame pivotally attached to a bottom portion of the cover body and supporting a pinch roller is moved to its opened position, whereby pressing contact between a feeder roller and the pinch roller is eliminated.

As described above, the known ADF is constructed such that when a document sheet is read, the document sheet is fed along the feed path, during which the document sheet is once fed out of the cover body at the open portion of the feed path so that the document sheet is fed over and along the platen glass at the open portion of the feed path. Then, the document sheet is fed back into the cover body. Even if the technique of any one of the publications 1-5 set forth above is employed in the ADF, removal of a document sheet caught at or around the open portion of the feed path involves (i) opening the cover body or document cover covering the platen glass, and (ii) eliminating the pressing contact between the feeder roller and the pinch roller. That is, at least two actions are required to take the caught document sheet out of the apparatus from the open portion of the feed path. However, when a document sheet caught at or around the open portion disposed at the bottom surface of the document cover should be removed, a user may feel that it is cumbersome to take the above-mentioned two actions, or may not know the way to eliminate the pressing contact between the feeder roller and the pinch roller, or the way to separate the feeder roller and the pinch roller from each other. In the former case, that is, when the user feels that taking the two actions is cumbersome, he or she may first open the document cover to expose a part of the document sheet to the exterior, and then forcibly pull out the document sheet pinched between the feeder roller and the pinch roller. The forcibly pulling out the document sheet pinched between the feeder roller and the pinch roller that are held in pressing contact with each other may damage the document sheet. In the latter case, that is, when the user does not know the way to eliminate the pressing contact between the feeder roller and the pinch roller, it takes much time to remove the caught document sheet.

SUMMARY OF THE INVENTION

This invention has been developed in view of the above-described situations, and it is an object of the invention to provide a cut-sheet feeding apparatus where a cut sheet caught in the cut-sheet feeding apparatus is easily and quickly removable.

To attain the above object, the invention provides a cut-sheet feeding apparatus including a first portion and a second portion which are relatively movable toward and away from each other to be switched between an opened state and a closed state. The second portion includes a main body which provides a feed path along which a cut sheet is fed, a first feed roller and a second feed roller, an elastic member, a movable support member, and a movable-support-member driving portion. The first feed roller is disposed at one of two opposite sides of the feed path, and fixed in position relative to the main body of the second portion, and the second feed roller is disposed at the other side of the feed path opposite to the first feed roller. The second feed roller is movable onto and away from the first feed roller. The elastic member has an operating portion and a supported portion, and operates to apply, from the operating portion, a biasing force to a shaft of the second feed roller in order to elastically press the second feed roller against the first feed roller. The movable support member supports the supported portion of the elastic member, and is movable relative to the main body such that a position of the movable support member is switchable between an operating position to press the second feed roller against the first feed roller by elastically deforming the elastic member, and a non-operating position to reduce the elastic deformation of the elastic member in order to allow the second feed roller to separate from the first feed roller. The movable-support-member driving portion contacts with and is driven by the first portion to move the movable support member to the operating position when the first and second portions are switched to the closed state, and moves away from the first portion to allow the movable support member to move to the non-operating position from the operating position when the first and second portions are switched to the opened state.

The cut sheet may be a document sheet to be read by an image reading device or an image scanner, or a recording medium on which an image is to be recorded by an image recording device. The first and second portions can be relatively moved toward and away from each other to be switched between the opened state and the closed state. At least one of the first and second portions is movable relative to the other, that is, it may be arranged such that only one of the first and second portions is movable relative to the other, or such that the first and second portions are movable relative to each other. Where only one of the first and second portions is movable relative to the other, the movable one may be either of the first and second portions. In accordance with the relative movement between the first and second portions, the movable support member can be moved relative to the main body and between the operating position and the non-operating position. When the first and second portions are switched to their closed state, the movable-support-member driving portion moves the movable support member to the operating position thereof to elastically deform the elastic member, in order to press the second feed roller against the first feeder roller based on the elastic force, whereby the first and second feed rollers become capable of nipping and feeding the cut sheet. On the other hand, when the first and second portions are switched to their opened state, the movable-support-member driving portion allows the movable support member to move to the non-operating position thereof so as to separate the second feed roller from the first feed roller, thereby eliminating pressing contact between the first and second feed rollers and disabling to nip the cut sheet therebetween. Thus, the state of the first and second feed rollers is switched between a state to nip the cut sheet therebetween and another state to release the cut sheet or not to nip the cut sheet, and the switching is associated with relative movement between the first and second portions.

Thus associating switching in the state between the first and second feed rollers with relative movement between the first and second portions enables a user to remove a cut sheet that is caught while fed in the apparatus with a part of the cut sheet nipped between the first and second feed rollers, simply by relatively moving the first and second portions to switch their state to the opened state, without taking another action to only release the cut sheet from the nip between the first and second feed rollers. Hence, the invention simplifies an operation to solve a paper jam and reduces the time required for the operation.

The invention also provides a document feeding apparatus disposed in a cover body supported by a document reading table an upper surface of which is at least partially constituted by a platen glass. The cover body is openable and closable relative to the document reading table such that the cover body covers the platen glass when closed. The document feeding apparatus feeds a document sheet along a feed path beginning at a document setting portion on which the document sheet is set and ending at a document ejecting portion onto which the document sheet as having been fed along the feed path is ejected. The document feeding apparatus includes a pair of feed rollers, a bearing member, a protrusible member, and a biasing member. The pair of feed rollers including an upper feed roller and a lower feed roller disposed below the upper feed roller, and disposed along the feed path in order to feed the document sheet by pinching the document sheet therebetween. The bearing member supports a shaft of the lower feed roller such that the lower feed roller is movable onto and away from the upper feed roller. The protrusible member is disposed in the cover body and below the lower feed roller, to be movable between an outer position to protrude from a bottom surface of the cover body and an inner position not to protrude from the bottom surface. The protrusible member is placed at the inner position by the document reading apparatus when the cover body is closed, and placed at the outer position when the cover body is open. The biasing member is supported by the protrusible member and biases the lower feed roller toward the upper feed roller, such that when the protrusible member is at the inner position, the lower feed roller is in pressing contact with the upper feed roller, and when the protrusible member is at the outer position, the lower feed roller is off the upper feed roller.

The document feeding apparatus can be considered as a type of the cut-sheet feeding apparatus where the cut sheet is a document sheet an image whereon is to be read. The similar operation and effect as those of the above-described cut-sheet feeding apparatus can be obtained according to the document feeding apparatus. That is, the cover body is supported by the document reading table to be openable and closable relative to the document reading table. In the cover body, the protrusible member is disposed such that the position of the protrusible member is switchable between the inner position not to protrude therefrom and the outer position to protrude from the bottom surface of the cover body. The protrusible member is placed at the inner position when the cover body is closed, and placed at the outer position when the cover body is opened. When the cover body is closed relative to the document reading table, the protrusible member is moved to the inner position by being brought into contact with the document reading table. With the protrusible member moved to its inner position, the biasing member supported by the protrusible member biases the lower feed roller onto the upper feed roller. Thus, the pair of feed rollers, namely, the upper and lower feed rollers can nip and feed the document sheet. When the cover body is opened relative to the document reading table, the protrusible member is allowed to move off the document reading table, and moved to the outer position, by receiving an elastic force from the biasing member as well as by its own weight in an initial phase, and only by its own weight in a latter phase in which the elastic force from the biasing member is eliminated. When the protrusible member is moved to the outer position, the lower feed roller moves downward and separates from the upper feed roller, with the shaft of the lower feed roller moving downward relative to the bearing member, by a weight of its own and the lower feed roller. Thus, pressing contact between the pair of feed rollers, namely, the upper and lower feed rollers is eliminated and the upper and lower feed rollers are disabled to nip the document sheet therebetween. In this way, the pair of feed rollers is switched between a state to nip the document sheet therebetween and another state to release the document sheet or not to nip the document sheet, and the switching is associated with opening and closing of the cover body relative to the document reading table.

The invention further provides a document-sheet reading apparatus including a document reading table and an openable-and-closable portion. The document reading table includes a platen glass and an image reading unit. The platen glass has a stationary-document setting portions and a fed-document reading portion. A stationary document sheet, which is a document sheet to be read while the document sheet is stationary, is set on the stationary-document setting portion. The fed-document reading portion is disposed apart from the stationary-document setting portion, and is a place to read a fed document sheet, which is a document sheet to be read while the document sheet is fed. The image reading unit is movable under and along the platen glass, and capable of reading both of the stationary document sheet on the stationary-document setting portion, and the fed document sheet passing over the fed-document reading portion. The openable-and-closable portion is opened and closed relative to the document reading table, and includes: a cover body, at least one pair of feed rollers, a driving member, and a state switcher. The cover body is movable between an opened position and a closed position relative to the document reading table such that the cover body covers the platen glass when at the closed position. The cover body provides a feed path along which a document sheet is guided. The feed path includes an open portion formed at a position to be opposed to the fed-document reading portion. The at least one pair of feed rollers is disposed on opposite sides of the feed path, and the pair of feed rollers pinch a document sheet therebetween and rotate to feed the document sheet along the feed path. The driving member is moved to a first position by the document reading table when the cover body is moved to the closed position, and allowed to move to a second position away from the first position when the cover body is moved to the opened position. The state switcher makes the at least one pair of feed rollers pinch a document sheet therebetween when the driving member is at the first position, and makes the at least one pair of feed rollers separate from each other to release a document sheet when the driving member is at the second position.

The document-sheet reading apparatus can be considered to be an apparatus for reading an image which includes a document-sheet feeding apparatus which is similar to the above-described document-sheet feeding apparatus but accords to a broader concept. Hence, a similar operation and effect similar to those of the document-sheet feeding apparatus can be obtained according to the document-sheet reading apparatus.

BRIEF DESCRIPTION OF THE DRAWINGS

The above and other objects, features, advantages and technical and industrial significance of the present invention will be better understood by reading the following detailed description of preferred embodiments of the invention, when considered in connection with the accompanying drawings, in which.

DETAILED DESCRIPTION OF PREFERRED EMBODIMENTS

Hereinafter, there will be described a multifunctional apparatus including an ADF (Automatic Document Feeder) according to one embodiment of the invention, by referring to the accompanying drawings.

Figure 1:
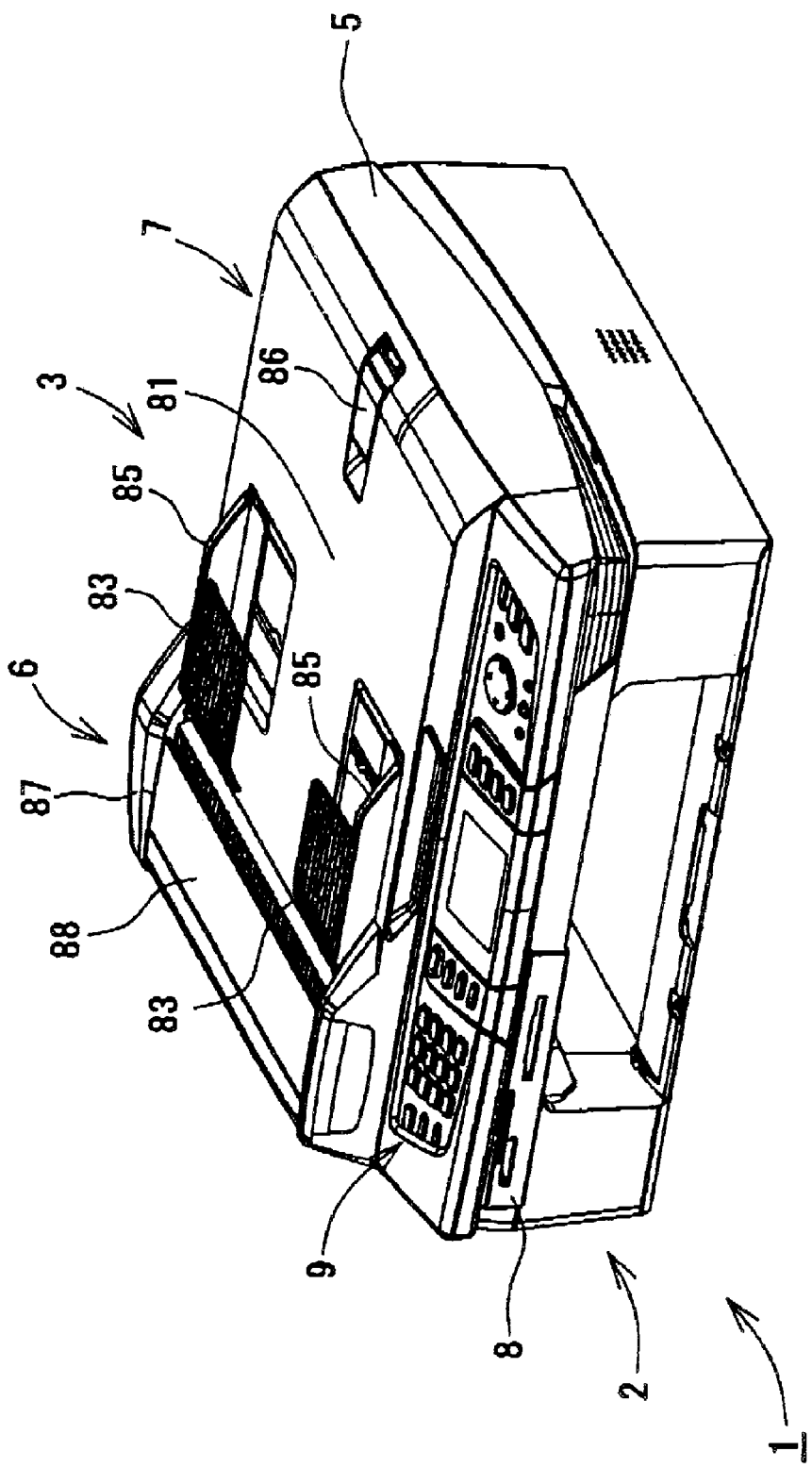
FIG. 1 is an external perspective view of a multifunctional apparatus including an ADF according to one embodiment of the invention.

Referring first to FIG. 1, reference numeral 1 generally denotes the multifunctional apparatus that includes the ADF 6 according to an embodiment of the invention. The multifunctional apparatus 1 may be referred to as MFD (Multi Function Device) that is an apparatus having two or more of a printer function, a scanner function, a copier function, a facsimile function, and other functions. The multifunctional apparatus 1 integrally includes a printer portion 2, a scanner portion 3, a document cover body 7, an operator panel 9, and a slot portion 8. The printer portion 2 constitutes a lower portion of the multifunctional apparatus 1, and the scanner portion 3 is disposed over the scanner portion 3. The document cover body 7 is disposed over the scanner portion 3. The operator panel 9 and the slot portion 8 are disposed in a front portion of an upper surface of the multifunctional apparatus 1.

The ADF 6 includes the document cover body 7, as a main body thereof, and enables the scanner portion 3 to read an image on a document sheet, and thus the above-mentioned functions other than the scanner function, such as printer function and copier function, are optional and not essential in the present invention. For instance, the ADF 6 according to the present embodiment may, be included in a scanner apparatus having only a scanner function, or may be included in a copier having the scanner portion 3 to feed a document sheet to the scanner portion 3.

The operator panel 9 disposed in the front portion of the upper surface of the multifunctional apparatus 1 includes various manual operation buttons and a liquid crystal display. The multifunctional apparatus 1 operates in accordance with an instruction input through the operator panel 9. Where the multifunctional apparatus 1 is connected to a computer, the multifunctional apparatus 1 can operate in accordance with an instruction transferred from the computer via a printer driver or a scanner driver, in addition to an instruction input through the operator panel 9.

Various kinds of small memory cards as recording media can be loaded into the slot portion 8. The slot portion 8 is disposed in an upper left portion in a front face of the multifunctional apparatus 1. When a small memory card is loaded in the slot portion 8, image data recorded in the memory card is read, and information on the image data is presented on the liquid crystal display in the operator panel 9, so that an operator or user can make the printer portion 2 record a desired image on a recording medium. Instructions necessary for recording the desired image are input through the operator panel 9.

Figure 2:
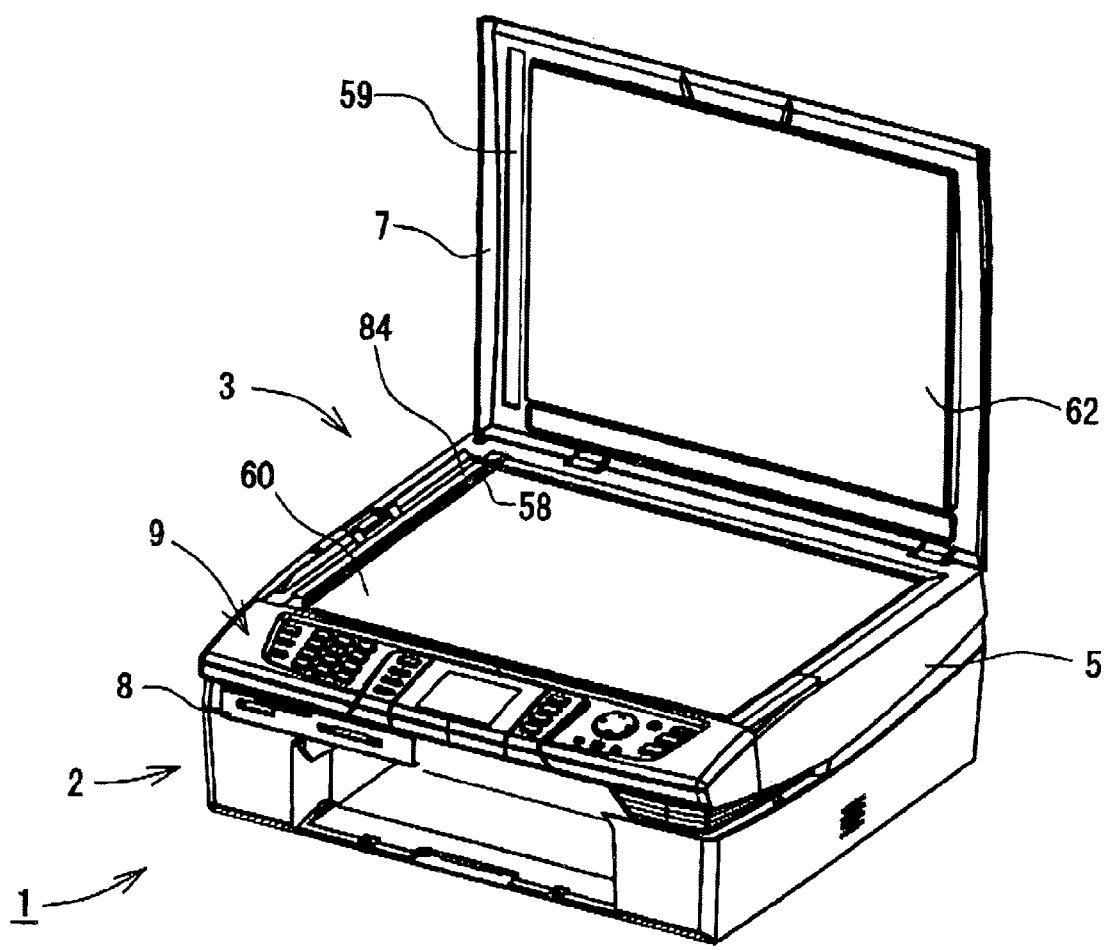
FIG. 2 is a perspective view of the multifunctional apparatus where a document cover is open.

As shown in FIG. 1, the scanner portion 3 includes a document reading table 5 functioning as a FBS (Flatbed Scanner), and the document cover body 7 including the ADF 6. The document cover body 7 is attached at a rear side thereof to the document reading table 5 via a hinge (not shown) such that the document cover body 7 is openable/closable relative to the document reading table 5. FIG. 2 is a perspective view of the multifunctional apparatus 1 in a state where the document cover body 7 is open.

The document reading table 5 constitutes a body of the multifunctional apparatus 1 and provides a part of the upper surface of the multifunctional apparatus 1. The document cover body 7 can also constitute a part of the upper surface of the multifunctional apparatus 1. As shown in FIG. 2, a platen glass 60 is disposed at an upper surface of the document reading table 5 that is opposed to the document cover body 7. As shown in FIG. 1, when the document cover body 7 is closed, the platen glass 60 is covered with the document cover body 7. In this state, the document cover body 7 constitutes a part of the upper surface of the multifunctional apparatus 1.

A document presser 62 is disposed at an under surface of the document cover body 7, that is, a surface of the document cover body 7 to be opposed to the platen glass 60, as shown in FIG. 2. The document presser 62 serves to hold down a document sheet that is put on the platen glass 60. For instance, the document presser 62 may be formed of a sponge material or a plate member. To maximize reliability in reception of reflected light by an image sensor 67 (described later), which light comes from a document sheet, the document presser 62 is solidly colored, e.g., in white, over an entire surface thereof.

Figure 4:
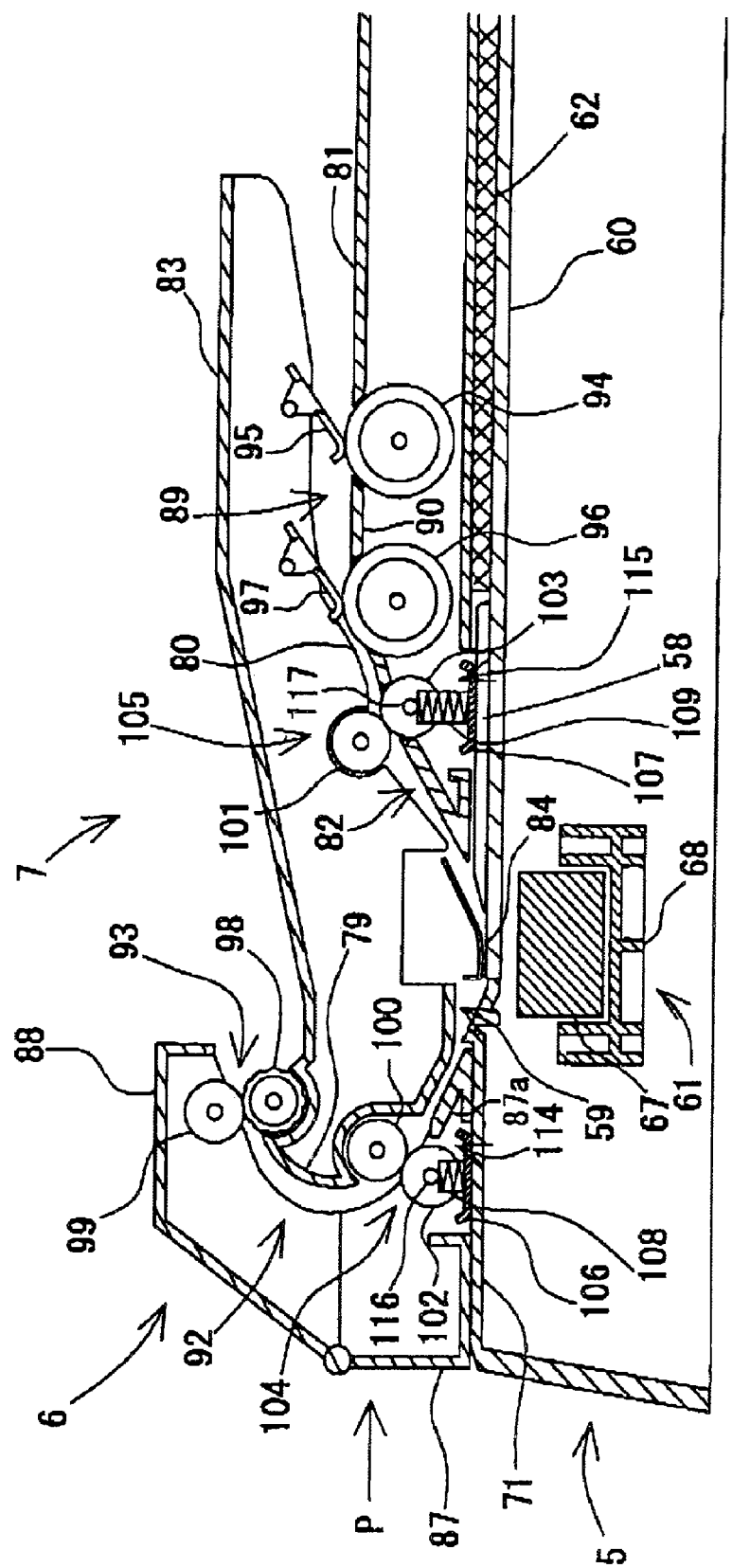
FIG. 4 is a cross-sectional view showing an internal structure of the ADF and its vicinity, where the document cover is closed.
Figure 5:
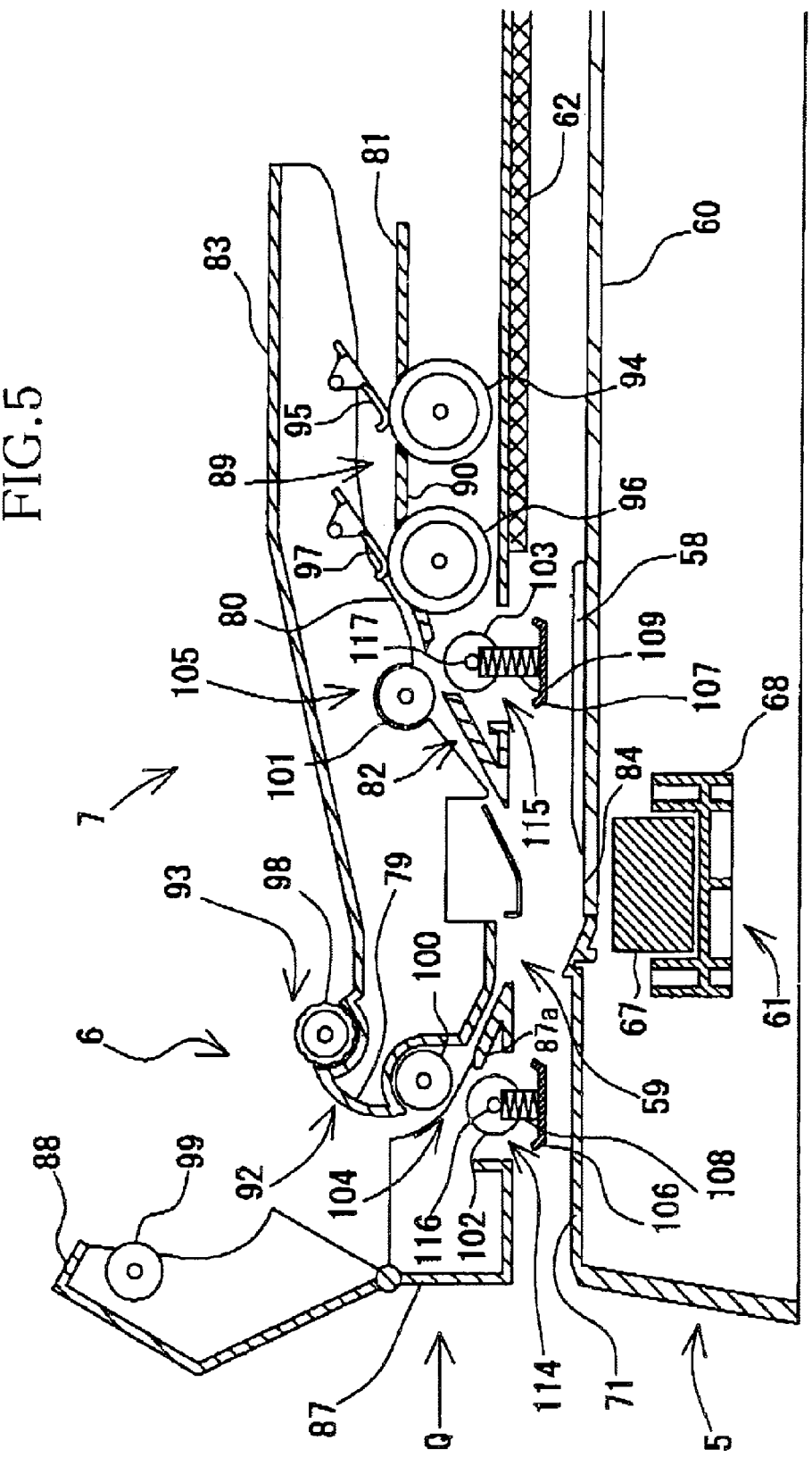
FIG. 5 is a cross-sectional view showing the internal structure of the ADF and its vicinity, where the document cover is open.

At the under surface of the document cover, 7, a feed path 82 opens. In other words, an open portion 59 of a feed path 82 is disposed in the under surface of the document cover body 7. The open portion 59 of the feed path will be described later and is shown in FIGS. 4 and 5. A document sheet, which is to be read (or an image on which is to be read) using the ADF 6, is exposed to the exterior of the document cover body 7 at the open portion 59 that is over a reading surface 84 in the platen glass 60, so that the scanner portion 3 can read the document sheet. After read, the document sheet is fed out of the open portion back into the document cover body 7, and further along the feed path 82. FIG. 2, in which an entirety of the multifunctional apparatus 1 is shown in a state where the document cover body 7 is open, is a rough illustration and a first and a second movable support member 106, 107 and a first and a second opening 114, 115 (all of which will be described later) are not shown therein.

The platen glass 60 is a member on which a document sheet is put when the scanner portion 3 or its document reading table is used as FBS. Although the platen glass 60 takes the form of a transparent glass plate in this specific example, any material other than a transparent glass plate) e.g., a transparent plastic material formed of resin, may be employed in place of the platen glass 60 to serve the same purpose as the platen glass 60.

A reference plate 58 is disposed on an upper surface of the platen glass 60. The reference plate 58 facilitates positioning of a document sheet on the platen glass when the document sheet is to be read by using the scanner portion 3 or its document reading table 5 as FBS. The reference plate 58 is a flat and elongate plate-like member, extending in a front-rear direction of the platen glass 60, which direction corresponds to a main scanning direction of the scanner portion 3. On an upper surface of the reference plate 58, symbols or the like that indicate a position at which opposite ends and a center, in the front-rear direction, of a document sheet in each of various sizes, e.g., A4 and B5, should be located.

A lateral end of the platen glass 60 is located near a position under a feeder roller 100. The reference plate 58 is disposed on the inner side of the lateral end of the platen glass 60 with some distance therebetween. An end portion of the platen glass having a width corresponding to the distance between the lateral end of the platen glass 60 and the reference plate 58 provides the reading surface 84. When the ADF 6 is used to read a document sheet, the document sheet is read during fed over the reading surface 84.

Figure 3:
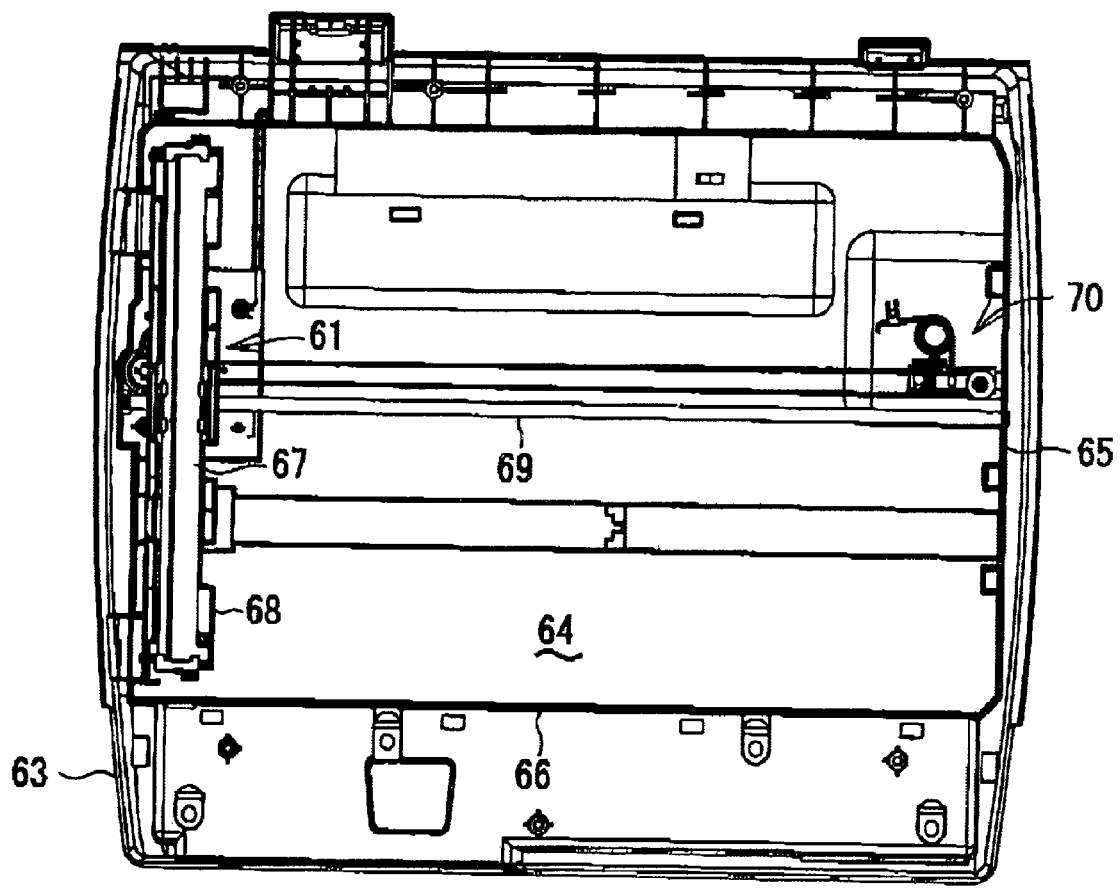
FIG. 3 is a top plan view of a document reading table of the multifunctional apparatus as seen from the upper side.

FIG. 3 is a plan view of the document reading table 5 as seen from the upper side of the platen glass 60, For convenience of illustration, the document cover body 7 is not shown in FIG. 3. As shown in FIG. 3, the document reading table 5 incorporates an image reading device 61 opposed to the platen glass 60.

There will be described an internal structure of the document reading table 5, with reference to FIG. 3. The document reading table 5 includes a lower frame 63 (shown in FIG. 3) and an upper cover 71 (shown in FIGS. 4 and 5) that are fitted together to form a housing of the document reading table 5. The image reading device 61 is disposed in the lower frame 63. The upper cover 71 has, at its center, an opening through which the platen glass 60 is exposed. Both of the lower frame 63 and the upper cover 71 are made of resin. The lower frame 63 integrally includes a base portion 64 constituting a bottom plate of the document reading table 5, side walls 65 extending upward from an edge of the base portion 64, and a separating plate 66 that divides an inner space of the document reading table 5 into a space in which the image reading device 61 is disposed and another space in which a circuit board connected to the operator panel 9 and others are disposed. Although the lower frame 63 further includes support ribs for supporting the platen glass 60, bosses to which various members are screwed, a through-hole for electrical wiring or for other purposes, and others, these are designed suitably for the mode of the document reading table 5, and detailed description thereof is not provided.

The image reading device 61 includes a CIS (Contact Image Sensor) 67, a carriage 68, a guide shaft 69, and a belt drive mechanism 70. The CIS 67 is an image sensor of contact type constructed such that a light source irradiates a document sheet with light, the reflected light from the document sheet is guided to a photoelectric transducer by means of a lens, and the photoelectric transducer outputs an electrical signal corresponding to the intensity or amount of the reflected light. The CIS 67 is mounted on the carriage 68 and reciprocated under the platen glass 60. The carriage 68 is fitted on the guide shaft 69 extending across the lower frame 63 in the lateral direction, and driven by the belt drive mechanism 70 to slide on the guide shaft 69. That is, when the carriage 68 slides on the guide shaft 69 with the CIS 67 being mounted on the carriage 68 and in contact with the platen glass 60, the CIS 67 is moved along the platen glass 60 or slid on the platen glass 60.

When the user desires to use the scanner portion 3 or its document reading table 5 as FBS, the user opens the document cover body 7, puts a document sheet on the platen glass 60, and closes the document cover body 7 to fix the document sheet in position on the platen glass 60. In response to an instruction to read the document sheet that is input through the operator panel 9 or others in this state, the image reading device 61 is reciprocated along the platen glass 60, in order to read the document sheet from the under side and via the platen glass 60. In this way, reading of a document sheet by using the document reading table 5 as FBS is implemented.

Although in this embodiment an image reading device including a CIS is employed, an image reading device including other types of image sensors may be employed instead. For instance, an image reading device including a CCD (Charge Coupled Device) or a CMOS (Complementary Metal-Oxide Semiconductor) may be employed.

Since in this embodiment the scanner portion 3 or its document reading table 5 is usable as FBS, the image reading device 61 is made reciprocable along the platen glass 60. However, the function of FBS is not essential for the scanner portion 3 in the present invention. That is, the scanner portion 3 may be constructed to read a document sheet always by using the ADF 6. In this case, the image reading device 61 is fixed in position under the reading surface 84, and the mechanism to reciprocate the image reading device 61 is unnecessary.

There will be now described in detail a structure of the document cover body 7 and the ADF 6. As shown in FIG. 1, the document cover body 7 includes the ADF 6, which automatically and sequentially feeds document sheets stacked on the supply tray 81 one by one, along the feed path 82 (shown in FIGS. 4 and 5) down to a catch tray 83. During each document sheet is fed by the ADF 6, the document sheet passes over the reading surface 84, where the image reading device 61 disposed under the reading surface 84 reads the document sheet.

On the upper side of the document cover body 7, the supply tray 81 and the catch tray 83 are disposed in vertical relation, that is, the catch tray 83 is disposed over the supply tray 81. The supply tray 81 is formed integrally with an upper surface of the document cover body 7. A stack of document sheets to be read using the ADF 6 is set on the supply tray 81 such that a front end portion, in the supply direction, of the stack is inserted in the ADF 6.

On the supply tray 81, a pair of document guides 85 are disposed such that the document guides 85 are spaced from each other in the front-rear direction of the multifunctional apparatus 1 and slidable in the same directions. The document guides 85 stand upright from the supply tray 81 to define the widthwise position of the stack of the document sheets set on the supply tray 81. The widthwise position of the stack of the document sheets corresponds to a position thereof in the front-rear direction of the multifunctional apparatus 1. Operations of the document guides 85 are coupled to each other by means of a known mechanism, so that when one of the document guides 85 is slid in a first direction, the other document guide 85 is also slid but in a second direction opposite to the first direction.

When the width of the stack of document sheets is small, the front-side one of the document guides 85 is slid rearward. This sliding movement causes frontward sliding movement of the rear-side one of the document guides 85. Thus, a distance between the document guides 85 can be decreased to correspond to the small width of the stack of document sheets, by the sliding movements of the document guides 85 that are symmetrical with respect to a substantially middle point between the document guides 85. On the other hand, when the width of the stack of document sheets is large, the front-side document guide 85 is slid frontward. This sliding movement causes rearward sliding movement of the rear-side document guide 85, so that the distance between the document guides 85 is increased to correspond to the large width of the stack of document sheets.

The document guides 85 are integrally formed with the catch tray 83 that is vertically spaced from the supply tray 81. That is, the catch tray 83 consists of two segments, and each of the segments is integrally formed with one of the document guides 85. Two opposite widthwise end portions of a document sheet ejected from the ADF 6 are received by the two segments of the catch tray 83, and thus the ejected document sheet is separated from the stack of document sheets yet to be read on the supply tray 81. A dimension of each segment of the catch tray 83 in a direction in which the document sheet is ejected (hereinafter referred to as "ejection direction") is smaller than that of the document sheet. Hence, a front end portion, in the ejection direction, of the document sheet drops from the catch tray 83 and is received by the supply tray 81. Thus, a front end portion, in the ejection direction, of a stack of ejected document sheets on the catch tray 83 overlaps a rear end portion, in the supply direction, of the stack of document sheets yet to be read and on the supply tray 81. However, since a front end portion, in the supply direction, of the stack of document sheets yet to be read, and a rear end portion, in the ejection direction, of the ejected document sheets are vertically separated from each other by the catch tray 83 supporting the read end portion of the ejected document sheets, the document sheets having been read do not mix with the stack of document sheets yet to be read. By having the dimension of the catch tray 83 in the supply direction relatively small, a space required over the document cover body 7 is reduced, whereby the multifunctional apparatus 1 can be made thin and small as a whole.

As shown in FIG. 1, a document stopper 86 is disposed at an end of the supply tray 81 remote from the ADF 6. The position of the document stopper 86 is switchable between a standing position and a lying position. When placed in the standing position, the stopper 86 stands upright from an upper surface of the supply tray 81, and when placed in the lying position, the stopper 86 becomes flush with the upper surface of the supply tray 81. For instance, the stopper 86 is raised to the standing position when a document sheet having a size similar to that of the supply tray 81 is to be ejected from the ADF 6 and to be prevented from dropping off the document cover body 7 by the stopper 86. The mode of the stopper 86 can reduce the size or area of the supply tray 81 or of the document cover body 7, thereby enabling to reduce the size of the multifunctional apparatus 1. When it is not necessary to stop or catch the ejected document sheet by the stopper 86, the stopper 86 is laid down to the laying position so as not to protrude from the document cover body 7. The stopper 86 is placed in the lying position to make the multifunctional apparatus 1 compact, when the multifunctional apparatus 1 is packed or not in use.

There will be now described in detail an internal structure of the ADF 6, with reference to FIGS. 4 and 5 that shows a cross section thereof in states where the document cover body 7 is closed and open, respectively.

As shown in FIGS. 4 and 5; the feed path 82 is formed in the ADF 6 and connects the supply tray 81 with the catch tray 83 disposed above the supply tray 81. Each of the document sheets set on the supply tray 81 is fed in a U-turn manner along the feed path 82 to the catch tray 83. The feed path 82 is defined by a main member 87, guide ribs 80, and a guide plate 79. The main member 87 is a portion of the document cover body 7. The guide ribs 80 are formed to extend downward from an under side of the catch tray 83. The guide plate 79 is formed integrally with the catch tray 83 to provide a guide surface along which a document sheet is guided. To the main member 87, an ADF cover 88 (shown in FIG. 1) is attached. The ADF cover 88 can be moved or turned upward and downward to be opened and closed relative to the main member 87.

The ADF 6 includes a pickup chute 89 that extends continuously from the upper surface of the supply tray 81 on which the stack of document sheets is set. The pickup chute 89 is formed as a passage or a prescribed vertical clearance defined between a lower guide surface that is provided by an upper surface of another guide plate 90 formed integrally with the main member 87, and an upper guide surface that is provided by lower end surfaces of the guide ribs 80. The stack of document sheets to be read using the ADF 6 is set on the supply tray 81 with the front end portion, in the supply direction, of the stack inserted in the pickup chute 89.

The ADF 6 further includes an ejection chute 93 formed continuously with and at a downstream end of the feed path 82 in a direction in which a document sheet is fed (hereinafter referred to as "feeding direction"). More specifically, the ejection chute 93 is a passage or a prescribed clearance defined by the main member 87, the guide plate 79, and others, to be continuous with the feed path 82.

The feed path 82 is a substantially U-shaped path beginning at the pickup chute 89 and ending at the ejection chute 93, and including the open portion 59 and a curving portion 92 between the pickup chute 89 and the ejection chute 93. The document sheets set on the supply tray 81 are one by one guided by the pickup chute 89 and fed to the curving portion 92 through the open portion 59. The document sheet is then ejected onto the catch tray 83 from the ejection chute 93. Thus, the document sheet is fed along the feed path 82 in a U-turn manner from the supply tray 81 to the catch tray 83.

Although in this embodiment the catch tray 83 is disposed above the supply tray 81, the positional relationship between the supply tray 81 and the catch tray 83 may be suitably changed. For instance, the invention is applicable to an ADF where a catch tray 83 is disposed below a supply tray 81 and a document sheet is fed along a feed path 82 from the supply tray 81 on the upper side of the catch tray 83 downward to the catch tray 83.

In the feed path 82, a pickup roller 94 and a pickup nipper 95 are disposed adjacent to each other and held in direct pressing contact with each other while not nipping a document sheet therebetween. Further, a separating roller 96 and a separating nipper 97 for feeding the document sheet in the feeding direction from the pickup chute 89 are also disposed in the feed path 82, such that the separating roller 96 and the separating nipper 97 are adjacent to each other and in direct pressing contact with the separating roller 96 while not nipping a document sheet therebetween. In the feed path 82, an ejecting roller 98 and a pinch roller 99 are also disposed adjacent to each other and in direct pressing contact with each other while the ADF cover 88 is closed and a document sheet is not nipped therebetween. The ejecting roller 98 and the pinch roller 99 operate to eject the document sheet out of the feed path 82 onto the catch tray 83. In the feed path 82 are further disposed feeder rollers 100, 101 (as upper feed rollers) that are driven by a motor (not shown), and pinch rollers 102, 103 (as lower feed rollers) that are respectively adjacent to the feeder rollers 100, 101 and are held in direct pressing contact therewith while not nipping a document sheet therebetween. The pinch rollers 102, 103 are disposed below the feeder rollers 100, 101 such that the feeder and pinch rollers 100 and 102 serve as a pair of feed rollers 104, and the feeder and pinch rollers 101 and 103 serve as another pair of feed rollers 105, and each pair is for pinching and feeding the document sheet. The description on the arrangement and structure of the ejecting roller 98, pinch roller 99, pickup roller 94, pickup nipper 95, separating roller 96, and separating nipper 97 is provided only for illustrative purpose, and these rollers 98, 99, 94, 96 and nippers 95, 97 may be modified. For instance, the number, or the positions, of the rollers 98, 99, 94, 96 may be changed, each of the nippers 95, 97 may be replaced with a pinch roller, and the pinch roller 99 may be replaced with a nipper. Any other known feeding methods may be applied to this embodiment. The number of pairs of feed rollers (including a feeder roller and a pinch roller) and the positions thereof may be suitably changed.

The pickup roller 94 is rotatably disposed substantially at a center of the pickup chute 89, with a part of an outer circumferential surface of the pickup roller exposed from the upper surface of the guide plate 90. Similarly, the separating roller 96 is rotatably disposed with an interval from the pickup roller 94 in the supply direction, with a part of an outer circumferential surface of the separating roller 96 exposed from the upper surface of the guide plate 90. The pickup roller 94 and the separating roller 96 are driven by a drive force from a motor (not shown). The pickup roller 94 and the separating roller 96 have a same diameter, and are rotated at a same circumferential velocity. The driving force of the motor is transmitted to the pickup roller 94 via a single-cycle clutch so that idle rotation of the pickup roller 94 is allowed up to a single full turn.

The pickup nipper 95 is disposed on one of the guide ribs 80 to be opposed to the pickup roller 94, such that the pickup nipper 95 is swingable toward and away from the pickup roller 94. The pickup nipper 95 is a pad-like member having a width slightly smaller than a width or an axial length of the pickup roller 94. The pickup nipper 95 is held by or attached to the guide rib 80 such that the pickup nipper 95 is pivotable about pivot shafts disposed at widthwise ends of the pickup nipper 95 on an upstream side in the supply direction, so that an end portion of the pickup nipper 95 at a downstream side in the supply direction is movable onto and away from the outer circumferential surface of the pickup roller 94. The pickup nipper 95 is elastically biased downward by a spring member to be held in direct pressing contact with the pickup roller 94 while not nipping a document sheet therebetween. Instead of the pickup nipper 95 in the form of a pad-like member, a roller may be used as a contact member to be held in direct pressing contact with the pickup roller 94 while not nipping a document sheet. However, a pad-like member can easily realize such a contact member without occupying a large space, and is preferable. A pad-like member is preferable also in that the force to elastically bias the contact member is easily adjustable.

The separating nipper 97 is disposed on one of the guide ribs 80 at a position to be opposed to the separating roller 96. The separating nipper 97 is pivotable in a direction onto and away from the separating roller 96. The separating nipper 97 is a pad-like member having a width slightly smaller than a width or an axial length of the separating roller 96. The separating nipper 97 is pivotable about an axis disposed at an upstream side thereof in the supply direction, so that an end portion thereof on the downstream side in the supply direction is moved onto and away from the outer circumferential surface of the separating roller 96. The separating nipper 97 is elastically biased downward by a spring member to be held in direct pressing contact with the outer circumferential surface of the separating roller 96 while not nipping a document sheet therebetween. Instead of the separating nipper 97 that is a pad-like member, a roller may be used as a contact member to be held in contact with the separating roller 96 while not nipping a document sheet therebetween. However, a pad-like member can easily realize the contact, member without occupying a large space, and is preferable. A pad-like member is preferable also in that the force to elastically bias the contact member is easily adjustable.

The ejecting roller 98 and the pinch roller 99 in direct pressing contact therewith while not nipping a document sheet therebetween are disposed in the feed path 82 and on the side of the ejection chute 93. Similar to the pickup roller 94 and the separating roller 96, the ejecting roller 98 is driven by a drive force from a motor (not shown). The ejecting roller 98 is rotatably supported by the guide plate 79 disposed at the curving portion 92. At a position opposed to the ejecting roller 98, the pinch roller 99 is rotatably supported by or attached to the ADF cover 88. The ADF cover 88 is openable/closable relative to the main member 87. When the ADF cover 88 is opened, the pressing contact between the ejecting roller 98 and the pinch roller 99 is eliminated and the ADF cover 88 is separated from the ejecting roller 98 by a great distance, with the ejection chute 93 wide opened. Hence, by opening the ADF cover 88, it becomes possible to solve a paper jam occurring at the ejection chute 93, or to perform a maintenance work on the ejecting roller 98, the pinch roller 99, or other internal members or mechanisms.

The pair of feed rollers 104, namely, the feeder roller 100 and the pinch roller 102 is disposed in the curving portion 92 that is located on the downstream side, in the supply direction, of the open portion 59 of the feed path 82. The feeder roller 100 is rotatably supported by or attached to the guide plate 79. The pinch roller 102 is mounted on a shaft 116, which is supported by a first movable support member 106 (protrusible member) and a spring member 108 (elastic member or biasing member). The first movable support member 106 and the spring member 108 are disposed under the pinch roller 102, and the spring member 108 is supported by the first movable support member 106. On the other hand, the pair of feed rollers 105, namely, the feeder roller 101 and the pinch roller 103, are disposed in a portion of the feed path 82 between the separating roller 96 and the open portion 59, in the supply direction. The feeder roller 101 is rotatably held by or attached to the guide rib 80. A rotation axis 117 of the pinch roller 108 is supported by a second movable support member 107 (protrusible member) and a spring member 109 (biasing member). The second movable support member 107 and the spring member 109 are disposed under the pinch roller 103, and the spring member 109 is supported by the second movable support member 107. Each of the feeder rollers 100, 101 is driven by a drive force from a motor (not shown), similar to the pickup roller 94 and the separating roller 96. The structure of supporting the pinch rollers 102, 103 will be fully described later.

Each of the first and second movable support members 106, 107 is supported by the main member 87 such that the movable support members 106, 107 are vertically movable. The under surface of the document cover body 7 has a first and a second opening 114, 115 open downward at positions corresponding to the movable support members 106, 107, respectively. When the document cover body 7 is opened, the movable support members 106, 107 come out of the respective openings 114, 115. On the other hand, when the document cover body 7 is closed, under surfaces of the movable support members 106, 107 are brought into contact with the upper surface of the document reading table 5 and the movable support members 106, 107 are pushed into the openings 114, 115. That is, the position of each of the movable support members 106, 107 is switchable between an outer position to protrude from the under surface of the document cover body 7, and an inner position not to protrude from the under surface of the document cover body 7, or to be accommodated in the document cover body 7. The movable support member 106, 107 is placed at the outer position when the document cover body 7 is open, and placed at the inner position when the document cover is closed. The structure of supporting the movable support members 106, 107 will be fully described later.

When the document cover body 7 is closed, the under surface of the movable support member 106, 107 is brought into contact with the upper surface of the document reading table 5. To prevent damage of the platen glass 60 that is disposed at the upper surface of the document reading table 5 due to this contact between the movable support member 106, 107 and the document reading table 5, the pair of feed rollers 104 and the first movable support member 106 are disposed at a position to contact the upper cover 71 (shown in FIGS. 4 and 5) covering, as an edge frame of the platen glass 60, the upper surface of the document reading table 5. The pair of feed rollers 105 and the second movable support member 107 are disposed at a position to contact the reference plate 58 attached on the platen glass 60. Thus, the movable support members 106, 107 are disposed to contact the upper surface of the document reading table 5 at positions other than the platen glass 60, in order to prevent the movable support members 106, 107 from damaging the platen glass 60 upon contact thereof with the upper surface of the document reading table 5. Hence, the quality of an image obtained by reading a document through the platen glass 60, that is, the quality of an image obtained by using the document reading table 5 as FBS, is excellent.

Figure 6:
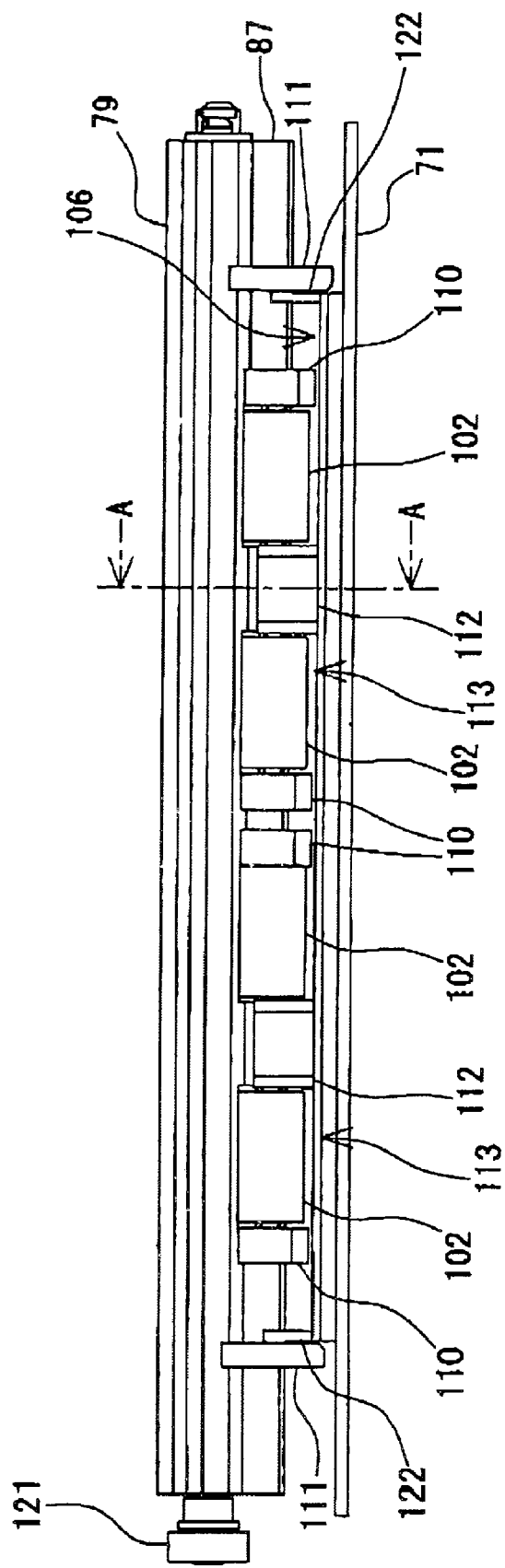
FIG. 6 is a view of a pair of feed rollers in the ADF as seen in a direction P indicated in FIG. 4.
Figure 7:
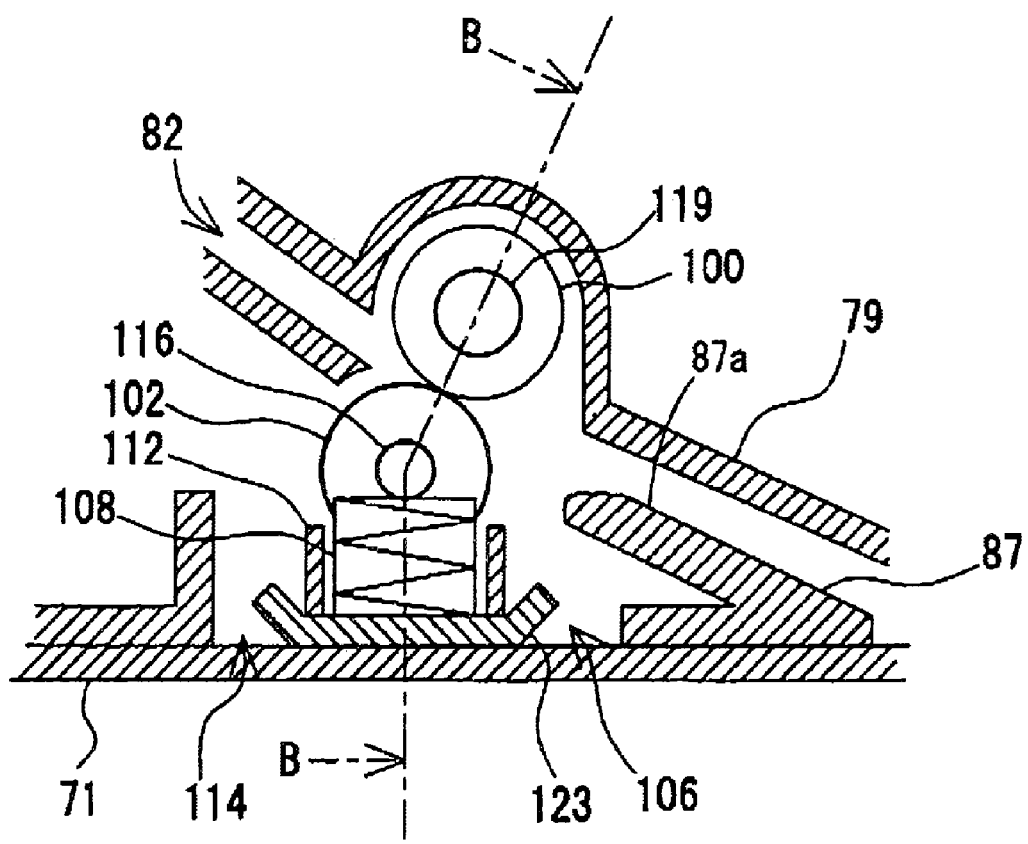
FIG. 7 is a cross-sectional view taken along line A-A in FIG. 6.
Figure 8:
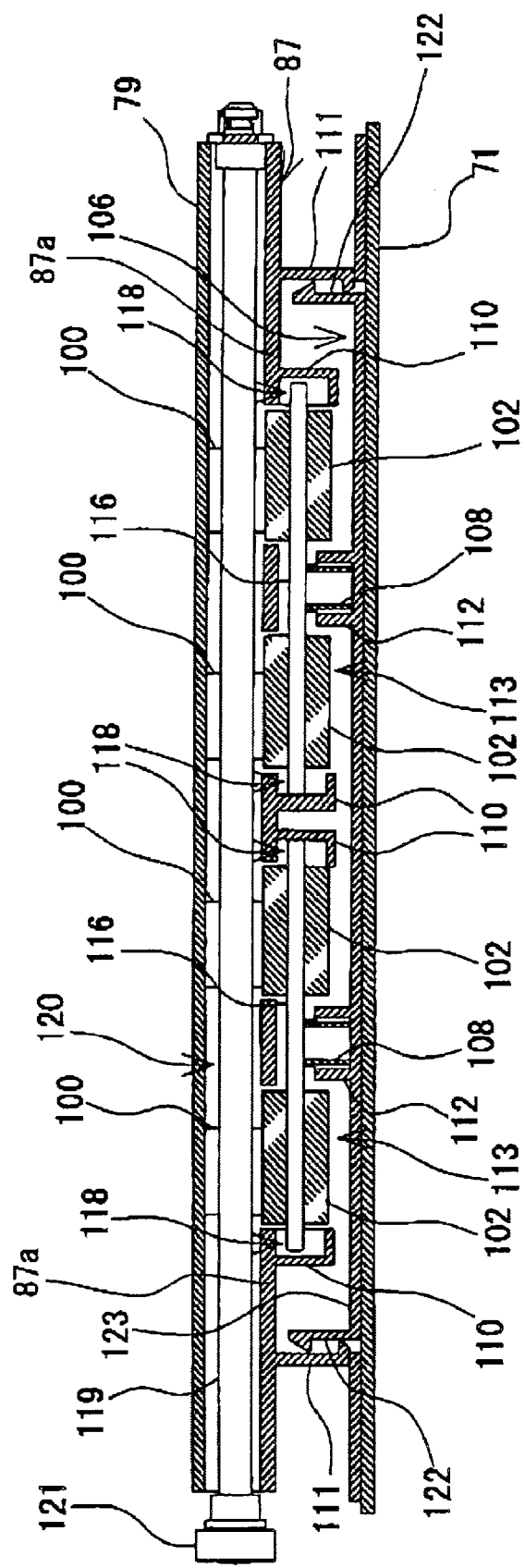
FIG. 8 is a cross-sectional view taken along line B-B in FIG. 7.
Figure 9:
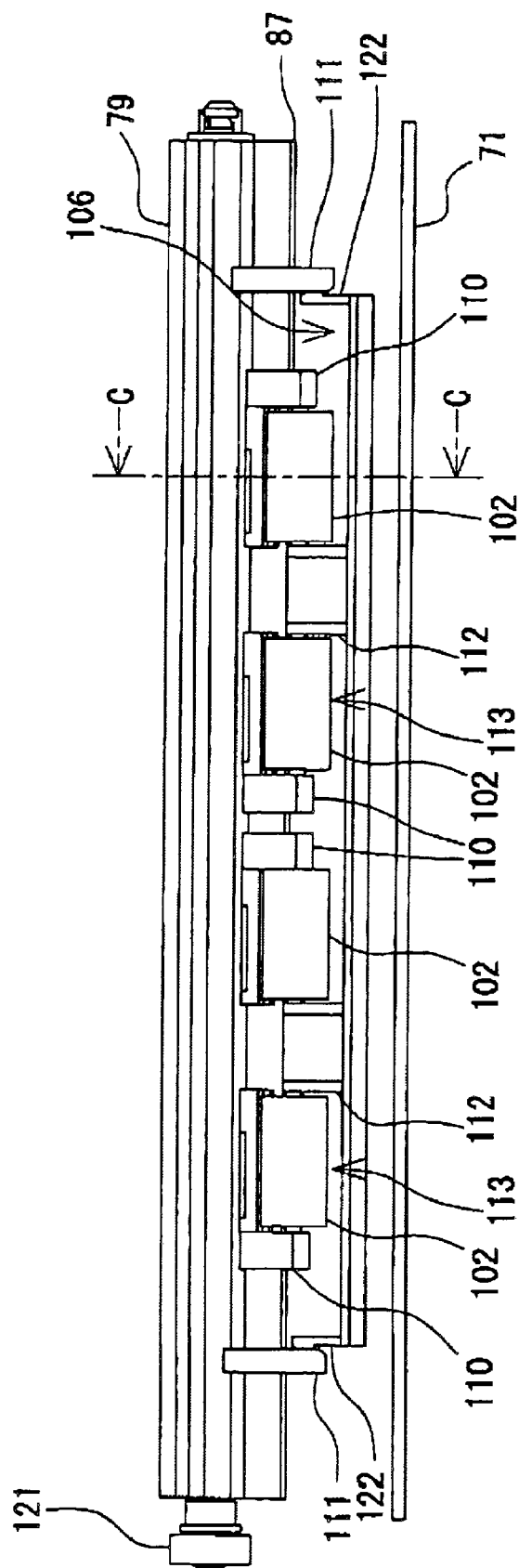
FIG. 9 is a view of the pair of feeder rollers as seen in a direction Q indicated in FIG. 5.
Figure 10:
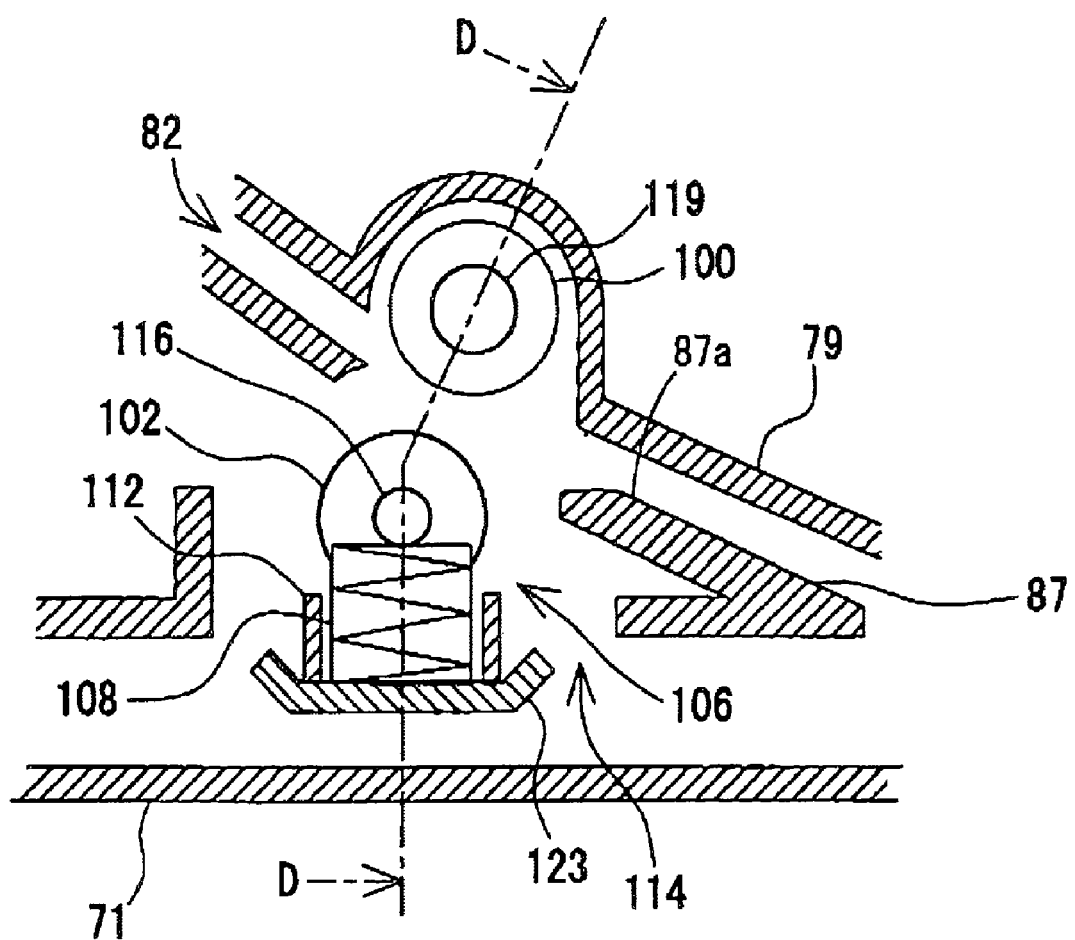
FIG. 10 is a cross-sectional view taken along line C-C in FIG. 9.
Figure 11:
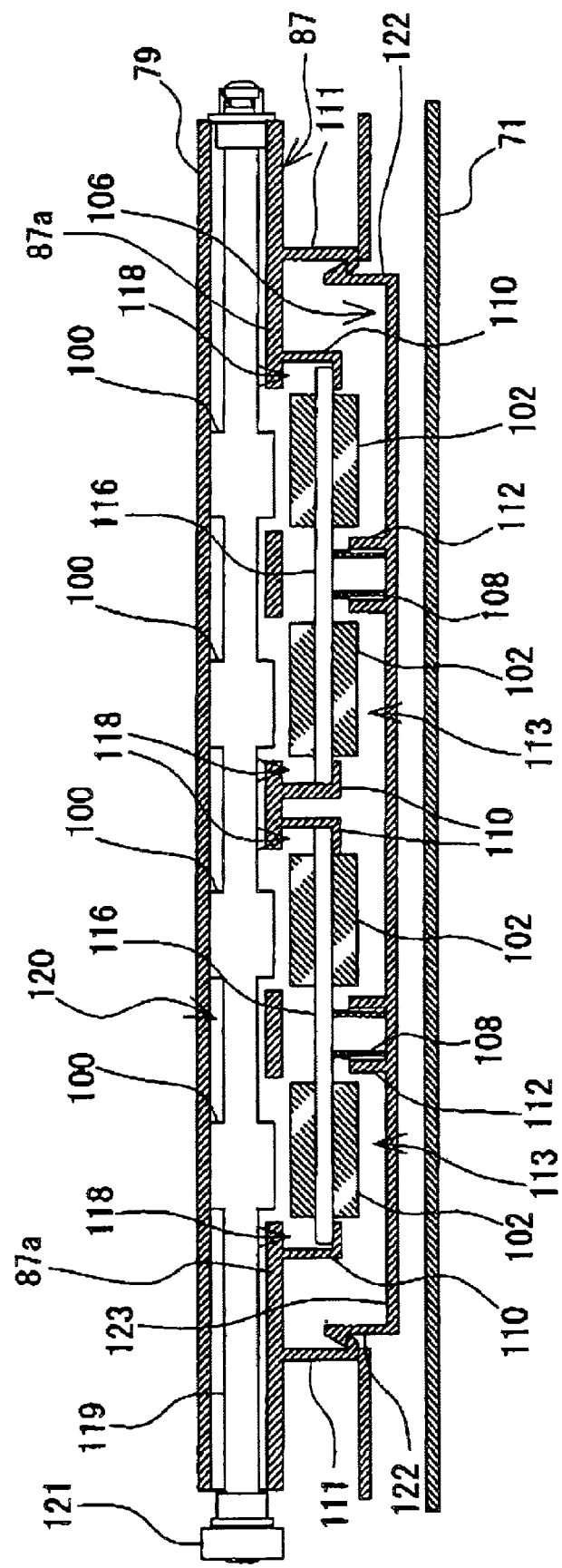
FIG. 11 is a cross-sectional view taken along line D-D in FIG. 10.

Referring now to FIGS. 6 to 11, the structure of supporting the pinch roller 102 and the first movable support member 106 will be described in detail. FIG. 6 is a view of the pair of feed rollers 104 (100, 102) as seen in direction P indicated in FIG. 4. FIG. 7 is a cross sectional view taken along line A-A in FIG. 6, and FIG. 8 is a cross-sectional view taken along line B-B in FIG. 7. FIG. 9 is a view of the pair of feed rollers 104 (100, 102) as seen in direction Q indicated in FIG. 5. FIG. 10 is a cross-sectional view taken along line C-C in FIG. 9, and FIG. 11 is a cross-sectional view taken along line D-D in FIG. 10. The structure of supporting the pinch roller 103 is identical with that of the pinch roller 102 and description thereof is omitted.

As shown in FIGS. 8 and 11, the feeder roller 100 in the ADF 6 consists of four segments that are themselves rollers of a same radius. Each segment of the feeder roller 100 will be hereinafter referred to as "segmental roller 100". The four segmental rollers 100 are arranged in a row to be rotatable around a same shaft 119. The four segmental rollers 100 and the shaft 119 connecting the four segmental rollers constitute a feeder roller assembly 120. The shaft 119 of the feeder roller assembly 120 is supported by, or attached to, the guide plate 79. A pulley 121 is fitted on an end portion of the shaft 119. An endless belt is wound around the pulley 121 and an output shaft of a motor (not shown), so that when the motor is driven, the drive force of the motor is transmitted to the pulley 121 through the endless belt to revolve the feeder roller assembly 120.

As shown in FIGS. 7, 8 and 11, the pinch roller 102 also consists of four segments that are themselves rollers of a same radius. Each segment of the pinch roller 102 will be hereinafter referred to as "segmental roller 102". Under the segmental rollers 100 of the feeder roller assembly 120, the four segmental rollers 102 are arranged in a row to be rotatable around a substantially same axis and opposed to the four segmental rollers 190, respectively. More specifically, each two of the four segmental rollers 102 are paired and connected by one shaft 116 around which each of the paired segmental rollers 102 is rotatable. The two segmental rollers 102 and the shaft 116 connecting the two segmental rollers 102 constitute one pinch roller assembly 113. Hence, the ADF 6 includes two pinch roller assemblies 113 that are coaxially arranged. The two segmental rollers 102 of each pinch roller assembly 113 are spaced from each other by a predetermined distance. Although one pinch roller assembly 113 includes two segmental rollers 102 in the present embodiment, the pinch roller assembly 113 may be otherwise embodied. For instance, four segmental rollers 102 connected by a same shaft may form one pinch roller assembly.

An upper surface of a lower plate member 87a of the main member 87 constitutes a lower guide surface of the feed path 82 at a position near the pair of feed rollers 104 (100, 102). At this position, bearing portions 110 are formed to protrude downward from the lower plate member 87a, as shown in FIGS. 8 and 11. More specifically, four bearing portions 110 are disposed to support two opposite end portions of the two shafts 116 of the pinch roller assemblies 113, thereby pivotably supporting the segmental rollers 102. Each of the bearing portions 110 includes a U-shaped portion 118 that is generally square U-shaped in cross section. A space formed inside the U-shaped portion 118 is long in the vertical direction as seen in an axial direction of the pinch roller assemblies 113, and has a width corresponding to a sum of a diameter of the shaft 116 and a predetermined allowance, so that the shaft 116 can be attached to and removed from the U-shaped portion 118. With the bearing portions 110 rotatably supporting the pinch roller assemblies 113 in this way, the pinch roller 102 or each pinch roller assembly 113 is supported to be vertically movable within a movable range.

The movable range of the pinch roller assembly 113 should not be smaller than a range between a separating position to separate the pinch roller 102 from the feeder roller 100, and a press-contact position to press the pinch roller 102 against the feeder roller 100. Hence, a vertical dimension of the space inside the U-shaped portion 118 is determined so that when the pinch roller assembly 113 is supported at a lower end of the U-shaped portion 118, the pinch roller 102 is separated from the feeder roller 100, and when the pinch roller assembly 113 is pushed upward, the pinch roller 102 can contact the feeder roller 100.

Guide portions 111 are disposed on axially opposite sides of the bearing portions 110 that are disposed on axially opposite sides of the pinch roller assemblies 113. Each of the guide portions 111 protrudes downward from the lower plate member 87a of the main member 87, similar to the bearing portions 110. The guide portions 111 are for holding or suspending the movable support member 106 such that the movable support member 106 is vertically movable. A lower end of each guide portion 111 constitutes an engaging portion in an inward projecting claw-like shape in cross section.

The movable support member 106 includes two standing portion 122, a bottom plate 123 as an elongate body of the movable support member 106, and two spring holders 112. The two standing portions 122 respectively engage with the engaging portions at the lower ends of the guide portions 111. A lower surface of the bottom plate 123 is to be contacted with the upper cover 71 of the document reading table 5. The spring member 108 is disposed on the inner side of the spring holder 112 such that the spring member 108 is compressible and expandable. The bottom plate 123 is provided by a flat plate member long in the axial direction of the pinch roller assemblies 113. At opposite longitudinal ends of the bottom plate 123, the standing portions 122 are formed. On an upper surface of the bottom plate 123, the spring holders 112 are formed. An upper end of each of the standing portions 122 constitutes an engaging portion that is outward projecting claw-like shaped in cross section. The engaging portion at the upper end of the standing portion 122 engages with the engaging portion at the lower end of the corresponding guide portion 111. When the engaging portions at the upper ends of the standing portions 122 are engaged with the engaging portions at the lower ends of the guide portions 111, the movable support member 106 is held by the guide portions 111 to be suspended from the under surface of the main member 87.

In a state where the movable support member 106 is suspended from the main member 87 by being held by the guide portions 111, with the engaging portions at the upper ends of the standing portions 122 in engagement with the engaging portions at the lower ends of the guide portions 111, as shown in FIG. 11, further downward movement of the movable support member 106 is inhibited. In this state, when the movable support member 106 is brought upward off the upper cover 71, the engaging portions at the upper ends of the standing portions 122 and the engaging portions at the lower ends of the guide portions 111 are disengaged from each other and the movable support member 106 moves upward. The upward movement of the movable support member 106 is allowed up to a position where an upper end of the movable support member 106, namely, upper ends of the engaging portions of the standing portions 122, contact an under surface of the lower plate member 87a whose upper surface constitutes the lower guide surface of the feed path 82. Thus, the movable support member 106 is held by the guide portions 111 to be vertically movable within a range.

The vertically movable range of the movable support member 106 is such that when the engaging portions of the standing portions 122 engage with the engaging portions of the guide portions 111 so that the movable support member 106 is suspended from the main member 87 by being held by the guide portions 111, the bottom plate 123 of the movable support member 106 gets out of the opening 114 formed in the bottom of the document cover body 7 or of the main member 87, and when the movable support member 106 is pushed upward by contact of the bottom plate 123 thereof with the upper cover 71 of the document reading table 5, the movable support member 106 gets into the opening 114. The movable support member 106 is allowed to enter the opening 114 up to a position where the lower surface of the bottom plate 123 becomes flush with the under surface of the main member 87. The movable support member 106 can vertically move within the above-described range, with the position of the movable support member 106 being changeable between the outer position to protrude from the under surface of the document cover body 7, and the inner position not protrude from the under surface of the document cover body 7.

On the upper surface of the bottom plate 123 of the movable support member 106, the two spring holders 112 are formed. Each of the spring holders 112 is opposed to an exposed portion of one of the shafts 116 of the pinch roller assemblies 113, which exposed portion is located between the two segmental rollers 102 of the pinch roller assembly 113. Each spring holder 112 is cylindrical in cross section, and open on its upper side. A lower portion of the spring member 108 is accommodated inside the spring holder 112. A lower end of the spring member 108 is supported on the movable support member 106. The spring member 108 operates to bias the pinch roller assembly 113 in order to press the pinch roller 102 onto the feeder roller 100. Various elements may be used as the spring member 108. For instance, a coil spring, a leaf spring, or a disc spring can be used as the spring member 108. The shape of the spring holder 112 is suitably determined depending on the element used as the spring member 108.

The spring member 108 is compressible and expandable, such that when the movable support member 106 is pushed into the main member 87 to be placed in the above-described inner position, the spring member 108 brings the pinch roller 102 in pressing contact with the feeder roller 100, and when the movable support member 106 is placed in the outer position, the spring member 108 releases the pinch roller 102 from the state of pressing contact with the feeder roller 100. A spring constant of the spring member 108 is suitably determined in order that the spring member 108 can operate as described above. As long as the spring constant is determined in this way, any spring member may be used as the spring member 108. Further, any elastic member other than spring members may be used in place of the spring member 108, as long as its spring constant is determined as described above.

More specifically, the spring member 108 is compressible and expandable such that when the position of the movable support member 106 is changed from the outer position to the inner position, the spring member 108 is compressed by an amount corresponding to a distance by which the movable support member 106 is moved upward, and a biasing force of the spring member 108 is thereby increased. The increased biasing force pushes the pinch roller assembly 113 upward by overcoming a weight of the pinch roller assembly 113, and generates a sufficient force to bring the pinch roller 102 and the feeder roller 100 in pressing contact with each other. On the other hand, when the position of the movable support member 106 is changed from the inner position to the outer position, the spring member 108 is expanded by an amount corresponding to a distance by which the movable support member 106 is moved downward, thereby decreasing the biasing force of the spring member 108. Thus, the weight of the pinch roller assembly 113 overcomes the biasing force of the spring member 108 to allow the pinch roller assembly 113 to move downward. This releases the pinch roller 102 from the state of pressing contact with the feeder roller 100, and the shaft 116 of the pinch roller assembly 113 is received by lower end portions of the U-shaped portions 118, as shown in FIG. 11. Thus, according to the present embodiment, when the movable support member 106 is at the outer position, the shaft 116 of the pinch roller assembly 113 is supported at the lower end of the U-shaped portions 118. However, the embodiment may be modified such that when the movable support member 106 is at the outer position and the pressing contact between the pinch roller 102 and the feeder roller 100 is eliminated, the pinch roller assembly 113 is supported only by the biasing force of the spring member 108.

There will be described how the state of the pinch rollers 102, 103 change with change in the position of the movable support members 106, 107 in the ADF 6. It is noted that the operation related to the pinch roller 102 is substantially identical with the operation related to the pinch roller 103, although the operation of the pinch roller may not be specifically described herein.

When an image is to be read using the ADF 6, the document cover body 7 is closed relative to the document reading table 5. The closing the document cover body 7 causes the under surfaces of the movable support members 106, 107 to contact the upper surface of the document reading table 5, whereby the movable support members 106, 107 are pushed upward. Accordingly, the position of the movable support members 106, 107 changes from the outer position in which the movable support members 106, 107 protrude from the under surface of the document cover body 7, to the inner position in which the movable support members 106, 107 do not protrude from, or are flush with, the under surface of the document cover body 7. Then, the spring members 108, 109 accommodated in the spring holders 112 of the movable support members 106, 107 are compressed to increase the biasing forces of the spring members 108, 109. The increased biasing forces push up the shafts 116 against the weights of the pinch roller assemblies 113. This brings the pinch rollers 102, 103 into pressing contact with the respectively corresponding feeder rollers 100, 101. That is, there is established a state where each pair of feed rollers 105, 104 (100 and 102, and 101 and 103) can feed a document sheet by pinching the document sheet therebetween.

When reading of a stack of document sheets is to be performed in this state, an end portion of the stack is inserted into the pickup chute 89 from the supply tray 81, whereby the stack is brought into contact with the pickup roller 94 and the pickup nipper 95. The stack is advanced deep into the pickup chute 89 by idle rotation of the pickup roller 94, so that the end portion of the stack reaches a nip between the separating roller 96 and the separating nipper 97. Then, in response to an instruction to start reading the document sheets that is inputted through the operator panel 9, the motor is operated by a control unit (not shown). The drive force of the motor is transmitted to the separating roller 96 to feed the document sheets one by one into the feed path 82.

Each document sheet thus fed into the feed path 82 is guided along the feed path 82 and downward to the reading surface 84. That is, the document sheet is nipped between the pair of feed rollers 105, namely, the feeder roller 101 and the pinch roller 103, that is disposed immediately downstream of the separating roller 96, and receives the rotating force of the feeder roller 101 to be fed down to the reading surface 84. At the reading surface 84, the document sheet is read by the image reading device 61. The document sheet is then further fed along the feed path 82 so that a front end portion of the document sheet in the feeding direction is nipped between the pair of feed rollers 104, namely, the feeder roller 100 and the pinch roller 102, that is disposed immediately downstream of the reading surface 84, and receives the rotating force of the feeder roller 100 to be fed along the curving portion 92 of the feed path 82. At the curving portion 92, the document sheet is fed in a U-turn manner so that the document sheet is turned over as being fed. While the document sheet is fed in the U-turn manner, the image reading device 61 keep reading the document sheet passing over the reading surface 84. When a rear end of the document sheet in the feeding direction has passed over the reading surface 84, the operation of the image reading device 61 is terminated. Then, the document sheet is nipped between the ejecting roller 98 and the pinch roller 99 to be ejected from the ejection chute 93 onto the catch tray 83.

While being fed as described above, the document sheet may be caught in the feed path 82, that is, a paper jam may occur. Where the document sheet is caught with the front end portion of the document sheet is on the downstream side of the curving portion 92, the user can easily eliminate the caught document sheet by turning upward and open the ADF cover 88, as shown in FIG. 5, thereby wide opening the ejection chute 93 and the curving portion 92. On the other hand, when the document sheet is caught with the rear end portion thereof on the upstream side of the curving portion 92, the user can not take out the document sheet by opening the ADF cover 88. In a case where a part of the caught document sheet is located in the open portion 59 of the feed path 82, it is particularly difficult to take out the document sheet by opening the ADF cover 88.

However, according to the present ADF 6, the user can easily take out the document sheet without damaging the document sheet, even in such a difficult case. That is, the user can take out the document sheet from the open portion 59 by simply opening the document cover body 7 of the ADF 6. More specifically, when the document cover body 7 is opened relative to the document reading table 5, as shown in FIG. 5, the under surfaces of the movable support members 106, 107 get off the document reading table 5, while the movable support members 106, 107 are allowed to move downward, that is, become vertically movable. By the weights of the movable support members 106, 107 themselves, or by receiving the weights of the pinch roller assemblies 113, the movable support members 106, 107 move downward to the outer position. At this time, the spring members 108, 109 accommodated in the spring holders 112 of the movable support members 106, 107 accordingly expand to decrease the biasing forces thereof applied to the shafts 116 of the pinch roller assemblies 113, whereby the change of the position of the movable support members 106, 107 to the outer position is promoted. When the weights of the pinch roller assemblies 113 overcome the biasing forces of the spring members 108, 109, the pinch roller assemblies 113 move downward. This releases the pinch roller 102, 103 from the state of pressing contact with the feeder roller 100, 101. That is, the document sheet is released from the nip between each of the pairs of feed rollers 104, 105.

In this way, the pairs of feed rollers 104, 105 in the ADF 6 are switchable between a first state capable of nipping a document sheet therebetween, and a second state incapable of nipping a document sheet therebetween, and switching between the first and second states is coupled with opening/closing of the document cover body 7. In a conventional ADF, when a document sheet caught in a feed path is to be eliminated, it was required to eliminate pressing contact between a pair of feed rollers, in addition to open a document cover. Hence, when an operation to eliminate the nip is troublesome, or when a user does not know the way to release the document sheet from the nip, the user may try to pull out the caught document sheet or otherwise forcibly take out the document sheet while the document sheet is being pinched between the feed rollers, which can result in damage of the document sheet. However, according to the present ADF 6, even a user who does not know the way to eliminate the pressing contact between each pair of feed rollers 104, 105 can easily take out the document sheet from the open portion 59 or the pickup chute 89, by simply opening the document cover body 7 to expose to the exterior the open portion 59 of the feed path 82 which is at the bottom surface of the document cover body 7, since this opening action automatically eliminates the pressing contact between each pair of feed rollers 104, 105. Then the user simply pulls the caught document sheet out of the document cover body 7 from the open portion 59 or the pickup chute 89, thereby solving the paper jam. Thus, according to the present embodiment, a paper jam occurring at or around the open portion 59 of the feed path 82 can be quickly and easily solved.

Although there has been described one embodiment of the invention, it is to be understood that the invention is not limited to the details of the embodiment, but may be otherwise embodied with various modifications and improvements that may occur to those skilled in the art, without departing from the scope and spirit of the invention defined in the appended claims.

For instance, the sheet fed by the ADF 6 may not be a document sheet with an image to be read thereon, but may be a cut sheet on which an image is to be printed. In this case, the image reading device 61 is replaced with a printhead.

What is claimed is:

1. A document feeding apparatus disposed in a cover body supported by a document reading table an upper surface of which is at least partially constituted by a platen glass, the cover body being openable and closable relative to the document reading table such that the cover body covers the platen glass when closed, the document feeding apparatus feeding a document sheet along a feed path beginning at a document setting portion on which the document sheet is set and ending at a document ejecting portion onto which the document sheet as having been fed along the feed path is ejected, the document feeding apparatus comprising:
    a pair of feed rollers including an upper feed roller and a lower feed roller disposed below the upper feed roller, and disposed along the feed path in order to feed the document sheet by pinching the document sheet therebetween;
    a bearing member which supports a shaft of the lower feed roller such that the lower feed roller is movable onto and away from the upper feed roller;
    a protrusible member which is disposed in the cover body and below the lower feed roller, to be movable between an outer position to protrude from a bottom surface of the cover body and an inner position not to protrude from the bottom surface, the protrusible member being placed at the outer position when the cover body is open, and being placed at the inner position by the document reading table when the cover body is closed; and
    a biasing member supported by the protrusible member and biasing the lower feed roller toward the upper feed roller, such that when the protrusible member is at the outer position, the lower feed roller is off the upper feed roller, and when the protrusible member is at the inner position, the lower feed roller is in pressing contact with the upper feed roller.

2. The document feeding apparatus according to claim 1, wherein the feed path includes an open portion which opens in the bottom surface of the cover body at a position to be opposed to the platen glass, and the pair of feed rollers constitutes at least one of (i) an upstream pair of feed rollers for feeding the document sheet toward the open portion, and (ii) a downstream pair of feed rollers for feeding the document sheet having passed through the open portion.

3. The document feeding apparatus according to claim 1, wherein the protrusible member is placed at the inner position by being brought into contact with a portion of the upper surface of the document reading table which is constituted by a member other than the platen glass.

4. A document-sheet reading apparatus comprising:
    a document reading table, including:
        a platen glass, having:
            a stationary-document setting portion on which a stationary document sheet is set, the stationary document sheet being a document sheet to be read while the document sheet is stationary; and
            a fed-document reading portion disposed apart from the stationary-document setting portion, the fed-document setting portion being a place to read a fed document sheet, the fed document sheet being a document sheet to be read while the document sheet is fed; and
        an image reading unit which is movable under and along the platen glass, and capable of reading both of the stationary document sheet on the stationary-document setting portion, and the fed document sheet passing over the fed-document reading portion;
    an openable-and-closable portion which is opened and closed relative to the document reading table, the openable-and-closable portion including:
        a cover body which is movable between an opened position and a closed position relative to the document reading table such that the cover body covers the platen glass when at the closed position, and which provides a feed path along which a document sheet is guided and which includes an open portion formed at a position to be opposed to the fed-document reading portion;
        at least one pair of feed rollers that are disposed on opposite sides of the feed path, the feed rollers pinch a document sheet therebetween and rotate to feed the document sheet along the feed path;
        a driving member which is moved to a first position by the document reading table when the cover body is moved to the closed position, and allowed to move to a second position away from the first position when the cover body is moved to the opened position; and
        a state switcher which makes the at least one pair of feed rollers pinch a document sheet therebetween when the driving member is at the first position, and makes the at least one pair of feed rollers separate from each other to release a document sheet when the driving member is at the second position.

5. The document-sheet reading apparatus according to claim 4,
    wherein the at least one pair of feed rollers includes:
        a first feed roller disposed at one of two opposite sides of the feed path, and fixed in position relative to the cover body; and
        a second feed roller disposed at the other side of the feed path opposite to the first feed roller, the second feed roller being movable onto and away from the first feed roller,
    and wherein the state switcher includes:
        an elastic member having an operating portion and a supported portion, the elastic member operating to apply, from the operating portion, a biasing force to a shaft of the second feed roller in order to elastically press the second feed roller against the first feed roller; and
        a movable support member which supports the supported portion of the elastic member, and is movable relative to the cover body such that a position of the movable support member is switchable between an operating position to press the second feed roller against the first feed roller by elastically deforming the elastic member, and a non-operating position to reduce the elastic deformation of the elastic member in order to allow the second feed roller to separate from the first feed roller.

6. The document-sheet reading apparatus according to claim 5, wherein the driving member and the movable support member are integrally formed.

7. A cut-sheet feeding apparatus comprising:
a first portion and a second portion which are relatively movable toward and away from each other to be switched between an opened state and a closed state, the second portion comprising:
  a main body which provides a feed path along which a cut sheet is fed;
  a first feed roller which is disposed at one of two opposite sides of the feed path, and fixed in position relative to the main body of the second portion;
  a second feed roller which is disposed at the other side of the feed path opposite to the first feed roller, the second feed roller being movable onto and away from the first feed roller;
  an elastic member having an operating portion and a supported portion, the elastic member operating to apply, from the operating portion, a biasing force to a shaft of the second feed roller in order to elastically press the second feed roller against the first feed roller;
  a movable support member which supports the supported portion of the elastic member, and is movable relative to the main body such that a position of the movable support member is switchable between an operating position to press the second feed roller against the first feed roller by elastically deforming the elastic member, and a non-operating position to reduce the elastic deformation of the elastic member in order to allow the second feed roller to separate from the first feed roller; and
  a movable-support-member driving portion which contacts with and is driven by the first portion to move the movable support member to the operating position when the first and second portions are switched to the closed state, and which moves away from the first portion to allow the movable support member to move to the non-operating position from the operating position when the first and second portions are switched to the opened state.

8. The cut-sheet feeding apparatus according to claim 7, wherein the movable-support-member driving portion is formed integrally with the movable support member, and provided by a contact portion which is brought into contact with the first portion when the first and second portions are switched to the closed state, and separated from the first portion when the first and second portions are switched to the opened state.

9. The cut-sheet feeding apparatus according to claim 7, wherein the main body has:
  a bearing portion which holds the shaft of the second feed roller such that the second feed roller is movable onto and away from the first feed roller; and
  a movable-support-member supporting portion which holds the movable support member such that the movable support member is movable toward and away from the first feed roller.

10. The cut-sheet feeding apparatus according to claim 9, wherein the bearing portion includes a first-separation-limit determining portion which determines a limit of separation of the shaft of the second feed roller from the first feed roller,
and wherein the movable-support-member supporting portion has a second-separation-limit determining portion which determines a limit of separation of the movable support member from the first feed roller.

11. The cut-sheet feeding apparatus according to claim 7, wherein the elastic member is provided by a plurality of springs,
and wherein the movable support member has:
  an elongate body which extends in a direction perpendicular to a direction in which the cut sheet is fed by the first and second feed rollers; and
  a plurality of spring holders that are arranged along a longitudinal direction of the elongate body at intervals, the spring holders respectively hold the springs.

12. The cut-sheet feeding apparatus according to claim 11, wherein each of the springs is a compression coil spring, and each of the spring holders is provided by a bottomed cylindrical portion which positions the compression coil spring by encircling an outer circumference of the compression coil spring.

13. The cut-sheet feeding apparatus according to claim 12, wherein the compression coil spring directly contacts the shaft of the second feed roller at the operating portion thereof, and the supported portion of the compression coil spring is supported by a bottom portion of the bottomed cylindrical portion.

14. The cut-sheet feeding apparatus according to claim 11, wherein the movable support member has a pair of standing portions that respectively stand from two opposite longitudinal ends of the elongate body toward the first feed roller, and the main body includes two guide portions each of which slidably guides at least a part of a corresponding one of the standing portions.

15. The cut-sheet feeding apparatus according to claim 14, wherein each of the standing portions and each of the guide portions has an engaging portion, and the engaging portion of each standing portion engages with the engaging portion of the corresponding guide portion, whereby the limit of separation of the movable support member from the first feed roller is determined.

16. The cut-sheet feeding apparatus according to claim 7, wherein the first and second portions are switched to the opened state and the closed state by being relatively turned around an axis.

17. The cut-sheet feeding apparatus according to claim 7, as a portion of a document reading apparatus,
wherein a stationary portion as the first portion includes:
  a platen glass, having:
    a stationary-document setting portion on which a stationary document sheet is set as the cut sheet, the stationary document sheet being a document sheet to be read while the document sheet is stationary; and
    a fed-document reading portion disposed apart from the stationary-document setting portion, the fed-document setting portion being a place to read a fed document sheet as the cut sheet, the fed document sheet being a document sheet to be read while the document sheet is fed; and
  an image reading unit which is movable under and along the platen glass, and capable of reading both of the stationary document sheet on the stationary-document setting portion, and the fed document sheet passing over the fed-document reading portion, and wherein an openable-and-closable portion as the second portion covers the platen glass at the closed state, and includes a feed path along which a document sheet is guided and which includes an open portion formed at a position to be opposed to the fed-document reading portion.

18. The cut-sheet feeding apparatus according to claim 17, wherein the first and second feed rollers are disposed on each of the upstream and downstream sides of the open portion.

19. The cut-sheet feeding apparatus according to claim 17, wherein the openable-and-closable portion includes:

a document setting portion on which the fed document sheet to be read is set in order that the fed document sheet is supplied into the feed path therefrom; and a document ejecting portion receiving the fed document sheet which is ejected from the feed path after having been read.

* * * * *